United States Patent
Li et al.

(10) Patent No.: US 8,767,841 B1
(45) Date of Patent: Jul. 1, 2014

(54) SYSTEM AND METHOD FOR DE-MODULATING A HIGH-SUPPLY-DOMAIN DIFFERENTIAL SIGNAL AND A COMMON-MODE CLOCK IN A FRONT-END RECEIVER

(71) Applicant: QUALCOMM Incorporated, San Diego, CA (US)

(72) Inventors: Miao Li, San Diego, CA (US); Xiaohua Kong, San Diego, CA (US); Yan Hu, San Diego, CA (US); Zhi Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/783,751

(22) Filed: Mar. 4, 2013

(51) Int. Cl.
*H04L 25/00* (2006.01)

(52) U.S. Cl.
USPC .............. 375/257; 375/219; 375/354; 327/65

(58) Field of Classification Search
CPC .............. H04L 25/026; H04L 25/0266; H04L 25/0276; H04L 25/0292; H04L 25/0298; H04L 7/0087; H04L 7/06; H02M 3/00; H03L 5/00
USPC ......... 375/219, 220, 244, 257, 258, 354, 360; 327/50, 52, 53, 65, 108, 299
See application file for complete search history.

(56) References Cited

U.S. PATENT DOCUMENTS

| | | | |
|---|---|---|---|
| 6,084,452 A * | 7/2000 | Drost et al. | 327/175 |
| 7,365,569 B1 | 4/2008 | Venugopal | |
| 8,049,532 B1 | 11/2011 | Maangat et al. | |
| 8,175,172 B2 * | 5/2012 | Yamamoto | 375/257 |
| 2002/0140461 A1 * | 10/2002 | Enam et al. | 327/65 |
| 2006/0181320 A1 * | 8/2006 | Dreps et al. | 327/175 |
| 2010/0156532 A1 | 6/2010 | Wang et al. | |
| 2012/0187998 A1 | 7/2012 | Jarrar et al. | |

FOREIGN PATENT DOCUMENTS

TW 201106630 A 2/2011

* cited by examiner

*Primary Examiner* — Dac Ha
(74) *Attorney, Agent, or Firm* — Novak Druce Connolly Bove + Quigg LLP

(57) ABSTRACT

Techniques for de-modulating a high-supply-domain differential signal and a common-mode clock in a front-end receiver are described herein. In one embodiment, a method for receiving a signal comprises receiving the signal via a receiver input, the received signal comprising a differential signal and a common-mode clock signal. The method also comprises shifting the received signal from a first voltage range to a second voltage range that is lower than the first voltage range, and providing the shifted received signal on a first level-shifted signal line and a second level-shifted signal line. The method further comprises sensing voltage differences between the first and second level-shifted lines to recover the differential signal, and sensing common-mode voltages on the first and second level-shifted signal lines to recover the common-mode clock signal.

28 Claims, 6 Drawing Sheets

SYSTEM AND METHOD FOR DE-MODULATING A HIGH-SUPPLY-DOMAIN DIFFERENTIAL SIGNAL AND A COMMON-MODE CLOCK IN A FRONT-END RECEIVER

BACKGROUND

1. Field

Aspects of the present disclosure relate generally to receivers, and more particularly, to systems and methods for de-modulating a high-supply-domain differential signal and a common-mode clock in a front-end receiver.

2. Background

A device may include a front-end receiver for receiving an incoming signal from another device. The front-end receiver may perform front-end processing on the received signal before forwarding the signal to other components in the device for further processing. The other components in the device may include core devices (e.g., core transistors) that are not capable of handling the voltage levels of the incoming signal. Therefore, it may be difficult to receive the incoming signal without creating reliability issues at the core devices.

In some applications, the incoming signal may comprise a differential data signal and a common-mode clock signal. An example of such a signal is a multimedia high-definition link (MHL) signal in which a high-speed differential data signal is modulated with a low-frequency common-mode clock signal. In these applications, it may be difficult to separately process the differential data signal and the common-mode clock signal in the incoming signal.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a receiver is described herein. The receiver comprises a receiver input with a first receive signal line and a second receive signal line for receiving a signal, the received signal comprising a differential signal and a common-mode clock signal. The receiver also comprises a voltage-level shifter coupled to the first and second receive signal lines, and configured to shift the received signal from a first voltage range to a second voltage range that is lower than the first voltage range, and to provide the shifted received signal on a first level-shifted signal line and a second level-shifted signal line. The receiver also comprises a data buffer having a differential input coupled to the first and second level-shifted signal lines, and configured to recover the differential signal by sensing voltage differences between the first and second level-shifted signal lines. The receiver further comprises a clock recovery circuit coupled to the first and second level-shifted signal lines, and configured to recover the common-mode clock signal by sensing common-mode voltages on the first and second level-shifted signal lines.

A second aspect relates to a method for receiving a signal. The method comprises receiving the signal via a receiver input, the received signal comprising a differential signal and a common-mode clock signal. The method also comprises shifting the received signal from a first voltage range to a second voltage range that is lower than the first voltage range, and providing the shifted received signal on a first level-shifted signal line and a second level-shifted signal line. The method further comprises sensing voltage differences between the first and second level-shifted lines to recover the differential signal, and sensing common-mode voltages on the first and second level-shifted signal lines to recover the common-mode clock signal.

A third aspect relates to an apparatus for receiving a signal. The apparatus comprises means for receiving the signal via a receiver input, the received signal comprising a differential signal and a common-mode clock signal. The apparatus also comprises means for shifting the received signal from a first voltage range to a second voltage range that is lower than the first voltage range, and means for providing the shifted received signal on a first level-shifted signal line and a second level-shifted signal line. The apparatus further comprises means for sensing voltage differences between the first and second level-shifted lines to recover the differential signal, and means for sensing common-mode voltages on the first and second level-shifted signal lines to recover the common-mode clock signal.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
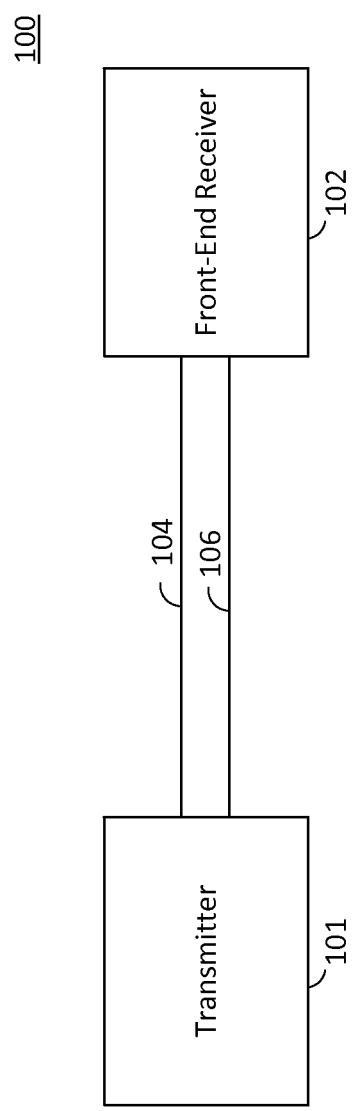
FIG. 1 shows an example of a system including a transmitter and a front-end receiver.

FIG. 1 shows an example of a system 100 including a transmitter 101 and a front-end receiver 102. The transmitter 101 may be located on a first device and the front-end receiver 102 may be located on a second device, in which the transmitter 101 and the front-end receiver 102 are used to transfer data and/or a clock from the first device to the second device over first and second transmission lines 104 and 106. The first and second transmission lines 104 and 106 may comprise a twisted wire pair, conductors in a coaxial cable or another type of cable, traces on a circuit board, etc. The transmitter 101 may transmit a differential data signal to the front-end receiver 102 over the first and second transmission lines 104 and 106. The front-end receiver 102 performs front-end processing on the received signal before forwarding the signal to other components in the second device for further processing.

The differential data signal may include video and/or audio data for transferring video and/or audio data from the first device to the second device. In this example, the first device may be a mobile device (e.g., a smartphone, a camera, etc.), a media player, a digital video recorder (DVR), a set-top box, or another type of device capable of providing video and/or audio data, and the second device may be a mobile device (e.g., a smartphone) with a display, a display device (e.g., a monitor), or another type of device capable of displaying video and/or playing audio data.

The transmitter 101 may also transmit a common-mode clock signal to the front-end receiver 102 over the first and second transmissions lines 104 and 106. The common-mode clock signal may be used by the second device to decode the data in the differential data signal. The transmitter 101 may transmit the common-mode clock signal and the differential data signal simultaneously over the first and second transmission lines 104 and 106 by modulating the differential data signal with the common-mode clock signal.

Thus, the front-end receiver 102 may receive an incoming signal over the first and second transmission lines 104 and 106 comprising the differential data signal and the common-mode clock signal. An example of such a signal is a multimedia high-definition link (MHL) signal. In this case, it is desirable for the front-end receiver 102 to demodulate the incoming signal to separate the differential data signal and the common-mode clock signal for separate processing.

The front-end receiver 102 may convert the differential data signal and/or the common-mode clock signal from a high-power-supply domain (e.g., 3.3 V) to a core-power-supply domain (e.g., 0.9 V) for processing by core devices (e.g., core transistors) in the second device. The core devices may be relatively small devices (e.g., devices with thin gate oxides) that can be damaged if exposed to voltages much higher than a core voltage (e.g., 0.9V). For example, a core device (e.g., core transistor) may experience gate-oxide breakdown if a voltage much higher than the core voltage is applied to the core device. Therefore, it is desirable for the front-end receiver 102 to convert the differential data signal and/or the common-mode clock signal from the high-power-supply domain to the core-power-supply domain for processing by the core devices.

Figure 2:
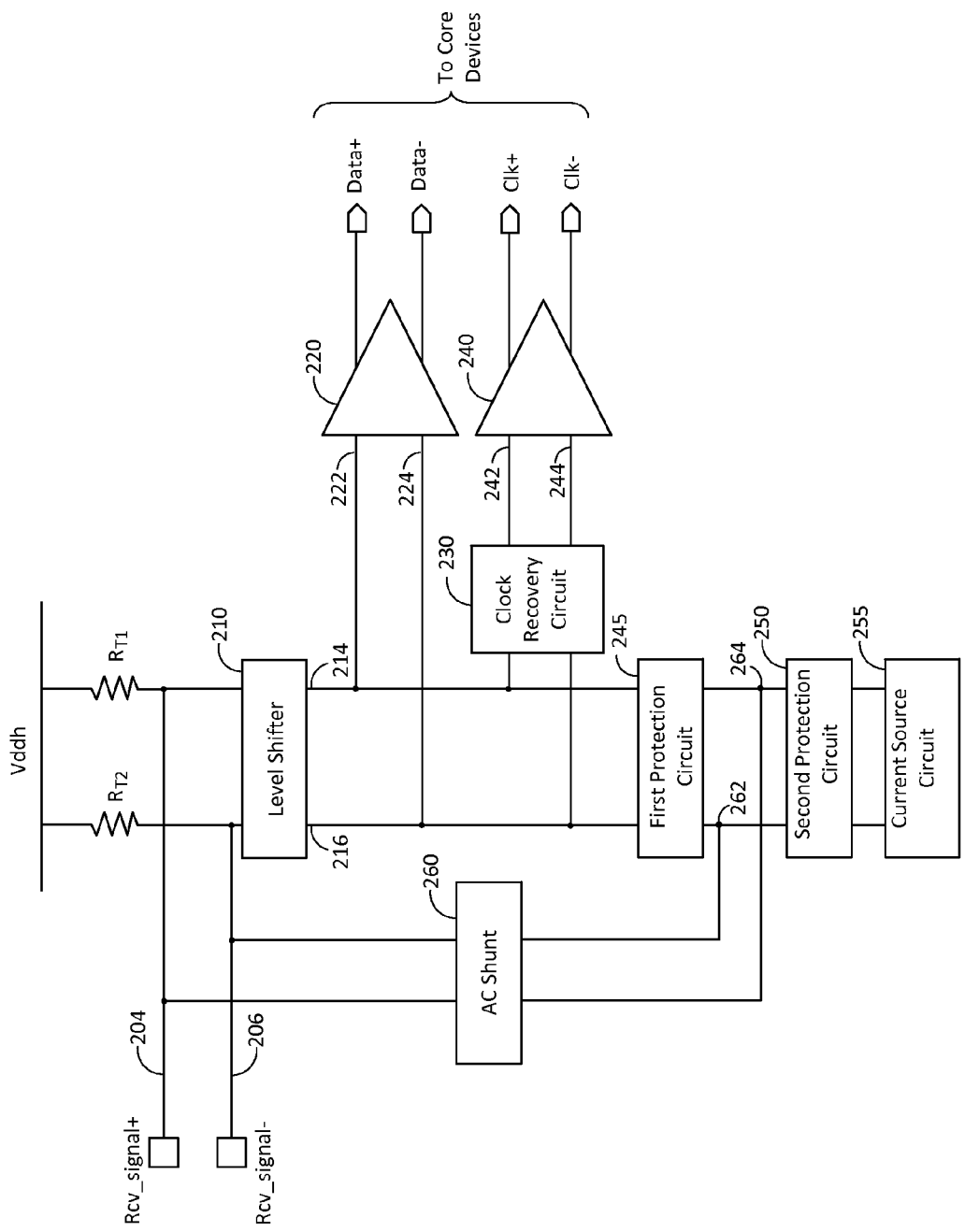
FIG. 2 shows a front-end receiver according to an embodiment of the present disclosure.

FIG. 2 shows a front-end receiver 202 according to an embodiment of the present disclosure. The front-end receiver 202 receives an incoming signal via a receiver input that includes a first receive signal line 204 coupled to the first transmission line 104 and a second receive signal line 206 coupled to the second transmission line 106. The incoming signal may be a high-voltage signal (e.g., 3.3 V) comprising a differential data signal modulated with a common-mode clock signal (e.g., an MHL signal). The front-end receiver 202 may be configured to separate the differential data signal and the common-mode clock signal, and convert each signal to the core-power-supply domain for processing by core devices in the second device.

The front-end receiver 202 comprises a voltage-level shifter 210, a data buffer 220, a clock buffer 240, a clock recovery circuit 230, a first protection circuit 245, a second protection circuit 250, a current source circuit 255, an AC shunt 260, and first and second termination resistors $R_{T1}$ and $R_{T2}$. These components may be implemented using input/output (I/O) devices and/or core devices. The I/O devices (e.g., I/O transistors) have larger channel dimensions (e.g., larger channel lengths) and/or oxide thicknesses than the core devices (e.g., core transistors), and are therefore capable of handling higher voltages. For example, the I/O devices may be fabricated using a 0.18 lam complementary metal-oxide-semiconductor (CMOS) process and the core device may be fabricated using a 20 nm CMOS process. In this example, the I/O devices may have a voltage range of approximately 1.8 V range or higher, while the core devices have a voltage range of approximately 0.9V. The voltage-level shifter 210, the first protection circuit 245, and the second protection circuit 250 may be implemented using I/O devices and the current source circuit 255 may be implemented using core devices. The data buffer 220 and the clock buffer 240 may be implemented using a combination of I/O and core devices, as discussed further below. The components of the front-end receiver 202 may on the same chip (die) or on two or more chips.

The level shifter 210 is configured to shift the voltages of the received signal on the first and second receive signal lines 204 and 206 to lower voltages on first and second level-shifted signal lines 214 and 216. For example, the level shifter 210 may lower the voltages of the received signal on the first and second receive signal lines 204 and 206 to voltage levels on the first and second level-shifted signal lines 214 and 216 that can be handled by I/O devices in the data buffer 220 and/or the clock buffer 240.

The level-shifted signal is input to a differential input 222 and 224 of the data buffer 220. The differential input 222 and 224 of the data buffer 220 senses voltage differences between the first and second level-shifted signal lines 214 and 216, while rejecting common-mode voltages on the first and second level-shifted signal lines 214 and 216. As a result, the data buffer 220 senses the differential data signal in the level-shifted received signal, while rejecting the common-mode clock signal (which is common to both the first and second level-shifted signal lines 214 and 216) via common-mode rejection. Thus, the data buffer 220 recovers the differential data signal from the level-shifted received signal. The data buffer 220 converts the differential data signal from the high-power-supply domain to the core-power-supply domain for processing by core devices.

The level-shifted signal is also input the clock recovery circuit 230. The clock recovery circuit 230 recovers the common-mode clock signal from the level-shifted signal by sensing common-mode voltages on the first and second level-shifted signal lines 214 and 216, and outputs a first clock signal and a second clock signal to a differential input 242 and 244 of the clock buffer 240 based on the recovered common-mode clock signal. For example, the first clock signal may be the recovered common-mode clock signal, and the second clock signal may be a time average of the recovered common-mode clock signal. The clock recovery circuit 230 may produce the time average of the common-mode clock signal using a low-pass filter, as discussed further below. The clock buffer 240 converts the first and second clock signals into a differential clock signal in the core-power-supply domain for processing by core devices.

The AC shunt 260 is configured to pass the AC portion of the differential data signal, and may be implemented using capacitors. The AC shunt 260 provides a path for the AC portion of the differential data signal from the receiver input to the data buffer 220 through the AC shunt 260 and the first protection circuit 245. This path is in parallel with the path from the receiver input to the data buffer 220 through the level shifter 210. As discussed further below, these parallel paths result in a signal increase that compensates for signal attenuation in the transmission lines 104 and 106, thereby extending the bandwidth of the receiver 202.

The current source circuit 255 is configured to provide DC bias currents for the front-end receiver 202. For example, the current source circuit 255 may provide DC bias currents for I/O devices in the level shifter 210, as discussed further below. In one embodiment, the current source circuit 255 is implemented using core devices (e.g., transistors). In this embodiment, the first and second protection circuits 245 and 250 are configured to lower the voltages on the level-shifted signal lines 214 and 216 even further to keep the voltages at the current source circuit 255 within the voltage range (e.g., 0.9 V) of the core devices in the current source circuit 255. Thus, the first and second protection circuits 245 and 250 provide voltage protection for the core devices in the current source circuit 255.

The first and second termination resistors $R_{T1}$ and $R_{T2}$ are used to provide impedance matching between the receiver input and the transmission lines 104 and 106. The first termination resistor $R_{T1}$ is coupled between the first receive signal line 204 and the high-supply voltage Vddh, and the second termination resistor $R_{T2}$ is coupled between the second receive signal line 206 and the high-supply voltage Vddh. The first and second termination resistors $R_{T1}$ and $R_{T2}$ may have impedances matching the characteristic impedances of the first and second transmission lines 104 and 106, respectively. For example, each of the termination resistors $R_{T1}$ and $R_{T2}$ may have an impedance of 50 ohms.

Figure 3:
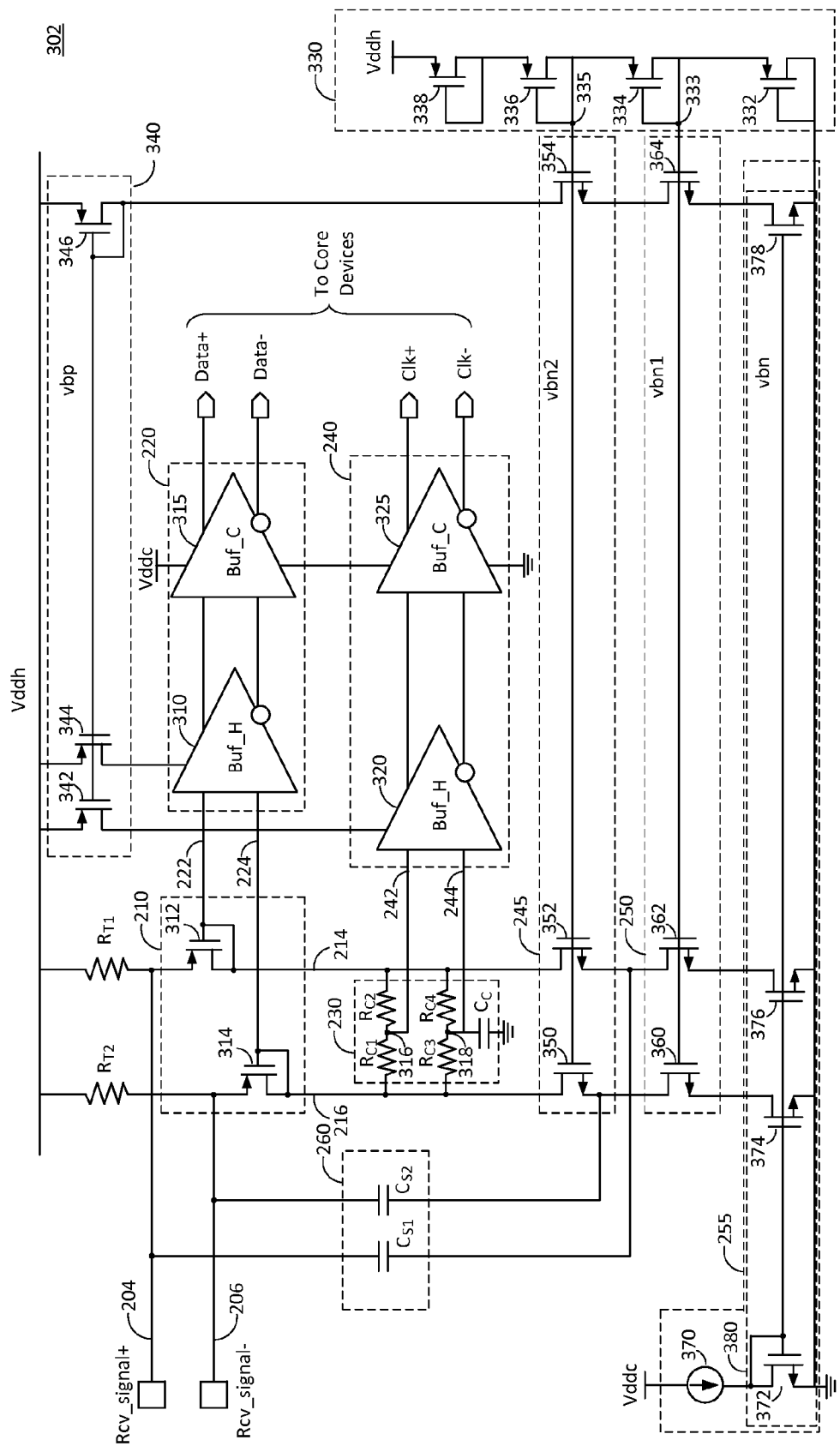
FIG. 3 shows an exemplary implementation of the front-end receiver according to an embodiment of the present disclosure.

FIG. 3 shows an exemplary implementation of the front-end receiver 302 according to an embodiment of the present disclosure.

The level shifter 210 comprises first and second diode-connected p-type metal-oxide-semiconductor (PMOS) transistors 312 and 314, in which the gate and drain of each PMOS transistor are tied together. The source of the first diode-connected PMOS transistor 312 is coupled to the first receive signal line 204, and the source of the second diode-connected PMOS transistor 314 is coupled to the second receive signal line 206. The current source circuit 255 provides DC bias currents for the first and second diode-connected PMOS transistors 312 and 314.

The first diode-connected PMOS transistor 312 lowers the voltage of the received signal on the first receive signal line 204 by an amount equal to the source-to-gate voltage drop across the first diode-connected PMOS transistor 312. Similarly, the second diode-connected PMOS transistor 314 lowers the voltage of the received signal on the second receive signal line 206 by an amount equal to the source-to-gate voltage drop across the second diode-connected PMOS transistor 314. The resulting level-shifted signal is output to the data buffer 220 and the clock recovery circuit 230 from the drains/gates of the first and second diode-connected PMOS transistors 312 and 314, as shown in FIG. 3.

The clock recovery circuit 230 comprises first and second clock resistors $R_{C1}$ and $R_{C2}$ coupled in series between the first and second level-shifted signal lines 214 and 216. The first and second clock resistors $R_{C1}$ and $R_{C2}$ may have approximately equal resistances such that the voltage at the node 316 between the resistors is the midpoint voltage between the voltages on the first and second level-shifted signal lines 214 and 216. The midpoint voltage is approximately equal to the common-mode voltage on the first and second level-shifted signal lines 214 and 216, assuming the voltages on the first and second level-shifted signal lines 214 and 216 due to the differential data signal have approximately equal amplitude and opposite polarity. Since the common-mode clock signal is common to both the first and second level-shifted lines 214 and 216, the common-mode clock signal is recovered at node 316 of the clock recovery circuit 230. The recovered common-mode clock signal is output to input 242 of the clock buffer 240.

The clock recovery circuit 230 also comprises third and fourth clock resistors $R_{C3}$ and $R_{C4}$ coupled in series between the first and second level-shifted signal lines 214 and 216. The third and fourth clock resistors $R_{C3}$ and $R_{C4}$ may have approximately equal resistances. The clock recovery circuit 230 also comprises a clock capacitor $C_C$ with one terminal coupled between the third and fourth clock resistors $R_{C3}$ and $R_{C4}$ at node 318 and another terminal coupled to ground. The combination of the third and fourth clock resistors $R_{C3}$ and $R_{C4}$ and the clock capacitor $C_C$ forms a low-pass filter that generates a time average of the common-mode clock signal at node 318. The averaged common-mode clock signal is output to input 244 of the clock buffer 240.

Figure 4:
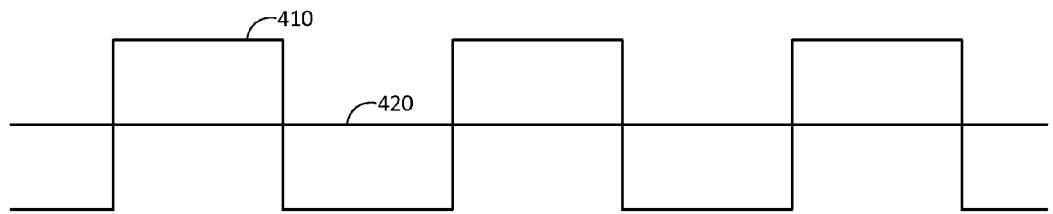
FIG. 4 shows an example of a common-mode clock signal and a time average of the common-mode clock signal according to an embodiment of the present disclosure.

Thus, the clock recovery circuit 230 inputs the common-mode clock signal and the averaged common-mode clock signal to the differential input 242 and 244 of the clock buffer 240. FIG. 4 shows a time diagram illustrating a simplified example of the common-mode clock signal 410 and the averaged common-mode clock signal 420. The clock buffer 240 converts the common-mode clock signal 410 and the averaged common-mode clock signal 420 into a differential clock signal made up of two complimentary clock signals. For a first one of the complimentary clock signals, the clock buffer 240 may output a logic one each time the common-mode clock signal 410 is above the averaged common-mode clock signal 420, and output a logic zero each time the common-mode clock signal 410 is below the averaged common-mode clock signal 420. For a second one of the complimentary clock signals, the clock buffer 240 outputs the compliment of the first complimentary clock signal.

Referring back to FIG. 3, the current source circuit 255 comprises a current source 370, a first n-type metal-oxide-semiconductor (NMOS) transistor 372, a second NMOS transistor 374, a third NMOS transistor 376, and a fourth NMOS transistor 378. The current source circuit 255 receives power from a core-supply voltage Vddc (e.g., 0.9 V), and each of the NMOS transistors 372-378 may be a core device. In one embodiment, the NMOS transistors 372-378 are core devices while the other transistors shown in FIG. 3 are I/O devices.

The NMOS transistors 372-378 are arranged to form a first current mirror 380, in which the gates of the NMOS transistors 372-378 are coupled together, the drain of the first NMOS transistor 372 is coupled to the current source 370, and the drain and gate of the first NMOS transistor 372 are tied together. The current from the current source 370 flows into the drain of the first NMOS transistor 372. This results in a gate voltage vbn at the first NMOS transistor 372 that is a function of the current from the current source 370. The gate voltage vbn is applied to the gates of the second, third and fourth NMOS transistors 374, 376 and 378, causing the currents of the second, third and fourth NMOS transistors 374, 376 and 378 to mirror the current from the current source 370. Thus, the current source 370 sets the currents of the second, third and fourth NMOS transistors 374-378.

In one embodiment, the currents of the second and third NMOS transistors 374 and 376 provide the DC bias currents for the first and second diode-connected PMOS transistors 312 and 314 of the level shifter 210. Since the second and third NMOS transistors 374 and 376 are core devices, they may not be able to handle voltages much higher than the core-supply voltage Vddc (e.g., 0.9V). In this regard, the first and second protection circuits 245 and 250 protect the first and second NMOS transistors 374 and 376 by lowering the voltages on the first and second level-shifted signal lines 214 and 216 to voltages within the voltage range of the first and second NMOS transistors 374 and 376. An exemplary implementation of the first and second protection circuits 245 and 250 is discussed below. The purpose of the fourth NMOS transistor 378 is discussed below.

The receiver 302 also comprises a bias network 330 for providing bias voltages.

The bias network 330 comprises a third diode-connected PMOS transistor 332, a fourth diode-connected PMOS transistor 334, a fifth diode-connected PMOS transistor 336, and sixth diode-connected PMOS transistor 338. The diode-connected PMOS transistors 332-338 are coupled in series between the high-supply voltage Vddh (e.g., 3.3 V) and ground, and form a voltage divider that provides bias voltages vbn1 and vbn2 at nodes 333 and 335, respectively. The bias voltage vbn1 at node 333 is approximately equal to the voltage drop across the third diode-connected PMOS transistor 332, and the bias voltage vbn2 at node 335 is approximately equal to the sum of the voltage drops across third and fourth diode-connected PMOS transistors 332 and 334. Assuming the voltage drop across each of the PMOS transistors 332-338 is approximately equal, the bias voltage vbn1 at node 333 is approximately one-fourth the high-supply voltage, and the bias voltage vbn2 at node 335 is approximately one-half the high-supply voltage.

The first protection circuit 245 comprises a fifth NMOS transistor 350, a sixth NMOS transistor 352, and a seventh NMOS transistor 354. The gate of each of the fifth, sixth and seventh NMOS transistors 350-354 is biased by the bias voltage vbn2 from the bias network 330.

The second protection circuit 250 comprises an eighth NMOS transistor 360, a ninth NMOS transistor 362, and a tenth NMOS transistor 364. The gate of each of the eighth, ninth and tenth NMOS transistors 360-364 is biased by the bias voltage vbn1 from the bias network 330.

The fifth NMOS transistor 350 is stacked on top of the eighth NMOS transistor 360 with the drain of the fifth NMOS transistor 350 coupled to the second level-shifted signal line 216, the source of the fifth NMOS transistor 350 coupled to the drain of the eighth NMOS transistor 360, and the source of the eighth NMOS transistor 360 coupled to the drain of the second NMOS transistor 374. Together, the fifth and eighth NMOS transistors 350 and 360 lower the voltage on the second level-shifted line 216 to a lower voltage at the drain of the second NMOS 374 (e.g., to a voltage within the voltage range of the second NMOS transistor 374). The voltage reduction may be approximately equal to the sum of the drain-to-source voltage drop across the fifth NMOS transistor 350 and the drain-to-source voltage drop across the eighth NMOS transistor 360.

The sixth NMOS transistor 352 is stacked on top of the ninth NMOS transistor 362 with the drain of the sixth NMOS transistor 352 coupled to the first level-shifted signal line 214, the source of the sixth NMOS transistor 352 coupled to the drain of the ninth NMOS transistor 362, and the source of the ninth NMOS transistor 362 coupled to the drain of the third NMOS transistor 376. Together, the sixth and ninth NMOS transistors 352 and 362 lower the voltage on the first level-shifted line 214 to a lower voltage at the drain of the third NMOS 376 of the current source circuit 255. The voltage reduction may be approximately equal to the sum of the drain-to-source voltage drop across the sixth NMOS transistor 352 and the drain-to-source voltage drop across the ninth NMOS transistor 362. The purpose of the seventh and tenth NMOS transistors 354 and 364 is discussed below.

The data buffer 220 comprises a high-power-supply data buffer 310 and a core-power-supply data buffer 315. The high-supply data buffer 310 receives power from the high-supply voltage vddh (e.g., 3.3 V), and the core-supply data buffer 315 receives power from the core-supply voltage vddc (e.g., 0.9). The high-supply data buffer 310 comprises I/O devices and is configured to convert the differential data signal to an output differential signal that is within the voltage range of the core-supply buffer 315 (e.g., 0.9 V). The core-supply data buffer 315 comprises core devices and is configured to output a differential data signal (Data+ and Data−) suitable for processing by core devices. An exemplary implementation of the high-supply data buffer 310 and the core-supply data buffer 315 is discussed below with reference to FIG. 6.

The clock buffer 240 comprises a high-power-supply clock buffer 320 and a core-power-supply clock buffer 325. The high-supply clock buffer 320 receives power from the high-supply voltage vddh (e.g., 3.3 V), and the core-supply clock buffer 325 receives power from the core-supply voltage vddc (e.g., 0.9). The high-supply data buffer 320 comprises I/O devices and is configured to convert the clock signals from the clock recovery circuit 230 into a differential clock signal that is within the voltage range of the core-supply clock buffer 325 (e.g., 0.9 V). The core-supply data buffer 325 comprises core devices and is configured to output a differential clock signal (Clk+ and Clk−) suitable for processing by core devices. An exemplary implementation of the high-supply clock buffer 320 and the core-supply clock buffer 325 is discussed below with reference to FIG. 6.

The receiver 302 also comprises a second current mirror 340. The second current mirror comprises a seventh PMOS transistor 342, an eighth PMOS transistor 344, and a ninth PMOS transistor 346. The sources of the PMOS transistors 342-346 are coupled to the high-supply voltage vddh (e.g., 3.3 V), and the gates of the PMOS transistors 342, 344 and 346 are coupled together. The drain of the ninth PMOS transistor 346 is coupled to the drain of the fourth NMOS transistor 378 of the current source circuit 255 through the seventh and tenth NMOS transistors 354 and 364 of the first and second protection circuits 245 and 250. The drain and gate of the ninth PMOS transistor 346 are coupled together. The drain of the seventh PMOS transistor 342 is coupled to the high-supply clock buffer 320 and the drain of the eighth PMOS transistor 344 is coupled to the high-supply data buffer 310.

The current of the fourth NMOS transistor 378 flows through the ninth PMOS transistor 346 via the seventh and tenth NMOS transistors 354 and 364. This results in a gate voltage vbp at the ninth PMOS transistor 346 that is a function of the current of the fourth NMOS transistor 378. The gate voltage vbp is applied to the gates of the seventh and eighth PMOS transistors 342 and 344, causing the currents of the seventh and eighth PMOS transistors 342 and 344 to mirror the current of the fourth NMOS transistor 378, which in turn mirrors the current from the current source 370, as discussed above. Thus, the current source 370 sets the currents of the seventh and eighth PMOS transistors 342 and 344. The current of the seventh PMOS transistor 342 provides a DC bias current for the high-supply clock buffer 320, and the current of the eighth PMOS transistor 344 provides a DC bias current for the high-supply data buffer 310, as discussed further below.

The seventh and tenth NMOS transistors 354 and 364 of the first and second protection circuits 245 and 250 lower the voltage at the drain of the ninth PMOS transistor 346 to a lower voltage at the drain of the fourth NMOS transistor 378. This is done to provide voltage protection for the fourth NMOS transistor 378, which is implemented using a core device. The seventh NMOS transistor 354 is stacked on top of the tenth NMOS transistor 364, in which the gate of the seventh NMOS transistor 354 is biased by the bias voltage vbn2 from the bias network 330, and the gate of the tenth NMOS transistor 364 is biased by the bias voltage vbn2 from the bias network 330.

The AC shunt 260 comprises a first shunt capacitor $C_{S1}$ with one terminal coupled to the first receive signal line 204 and another terminal coupled between the sixth NMOS transistor 352 and the ninth NMOS transistor 362 of the protection circuits 245 and 250. The AC shunt 260 also comprises a second shunt capacitor $C_{S2}$ with one terminal coupled to the second receive signal line 206 and another terminal coupled between the fifth NMOS transistor 350 and the eighth NMOS transistor 360 of the protection circuits 245 and 250.

The first shunt capacitor $C_{S1}$ creates a path for the AC portion of the differential data signal from the first receive signal line 204 to input 222 of the data buffer 220 through the sixth NMOS transistor 352 of the first protection circuit 245. This path runs in parallel with the path from the first receive signal line 204 to input 222 of the data buffer 220 through the first diode-connected PMOS transistor 312 of the level shifter 210.

Figure 5:
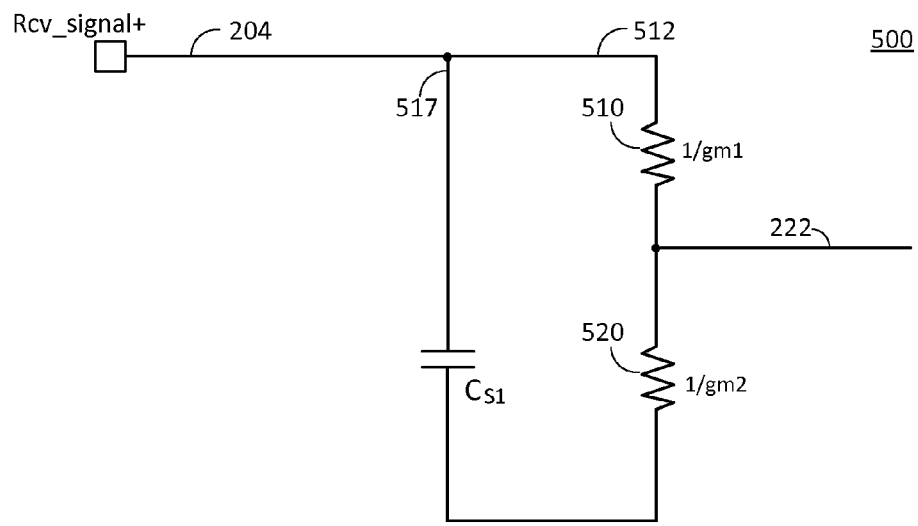
FIG. 5 show an example of an AC shunt path according to an embodiment of the present disclosure.

In this regard, FIG. 5 shows an equivalent circuit 500 of the two paths 512 and 517, where path 512 is the path through the first diode-connected PMOS transistor 312 of the level shifter 210, and path 517 is the path through the first shunt capacitor $C_{S1}$ and the sixth NMOS transistor 352 of the first protection circuit 245. In FIG. 5, the first diode-connected PMOS transistor 312 is represented by an equivalent resistor 510 having a resistance of 1/gm1, where gm1 is the transconductance of the first diode-connected PMOS transistor 312. Also, the sixth NMOS transistor 352 is represented by an equivalent resistor 520 having a resistance of 1/gm2, where gm2 is the transconductance of the sixth NMOS transistor 352.

As shown in FIG. 5, the first shunt capacitor $C_{S1}$ is coupled in parallel with the equivalent resistor 510 of the first diode-connected PMOS transistor 312, forming a parallel resistor-capacitor (RC) circuit. The parallel RC circuit creates a zero in the frequency response of the equivalent circuit 500, resulting in a signal increase at or near the zero. The placement of the zero in the frequency domain, and hence the signal increase, may be controlled by selecting an appropriate capacitance for the first shunt capacitor $C_{S1}$ and/or transconductance for the sixth NMOS transistor 352. The signal increase may be placed in the frequency domain to coincide with signal attenuation in the first transmission line 104, and therefore compensate for the signal attenuation. This compensation results in an overall frequency response that is flat over a wider bandwidth, and therefore extends the bandwidth of the receiver 302.

The second shunt capacitor $C_{S2}$ creates a path for the AC portion of the differential data signal from the second receive signal line 206 to input 224 of the data buffer 220 through the fifth NMOS transistor 350 of the first protection circuit 245. This path runs in parallel with the path from the second receive signal line 206 to input 224 of the data buffer 310 through the second diode-connected PMOS transistor 314 of the level shifter 210. These parallel paths result in a signal increase that can be used to compensate for signal attenuation in the second transmission line 106. This can be demonstrated by carrying out the analysis illustrated in FIG. 5 for the second shunt capacitor $C_{S2}$.

Figure 6:
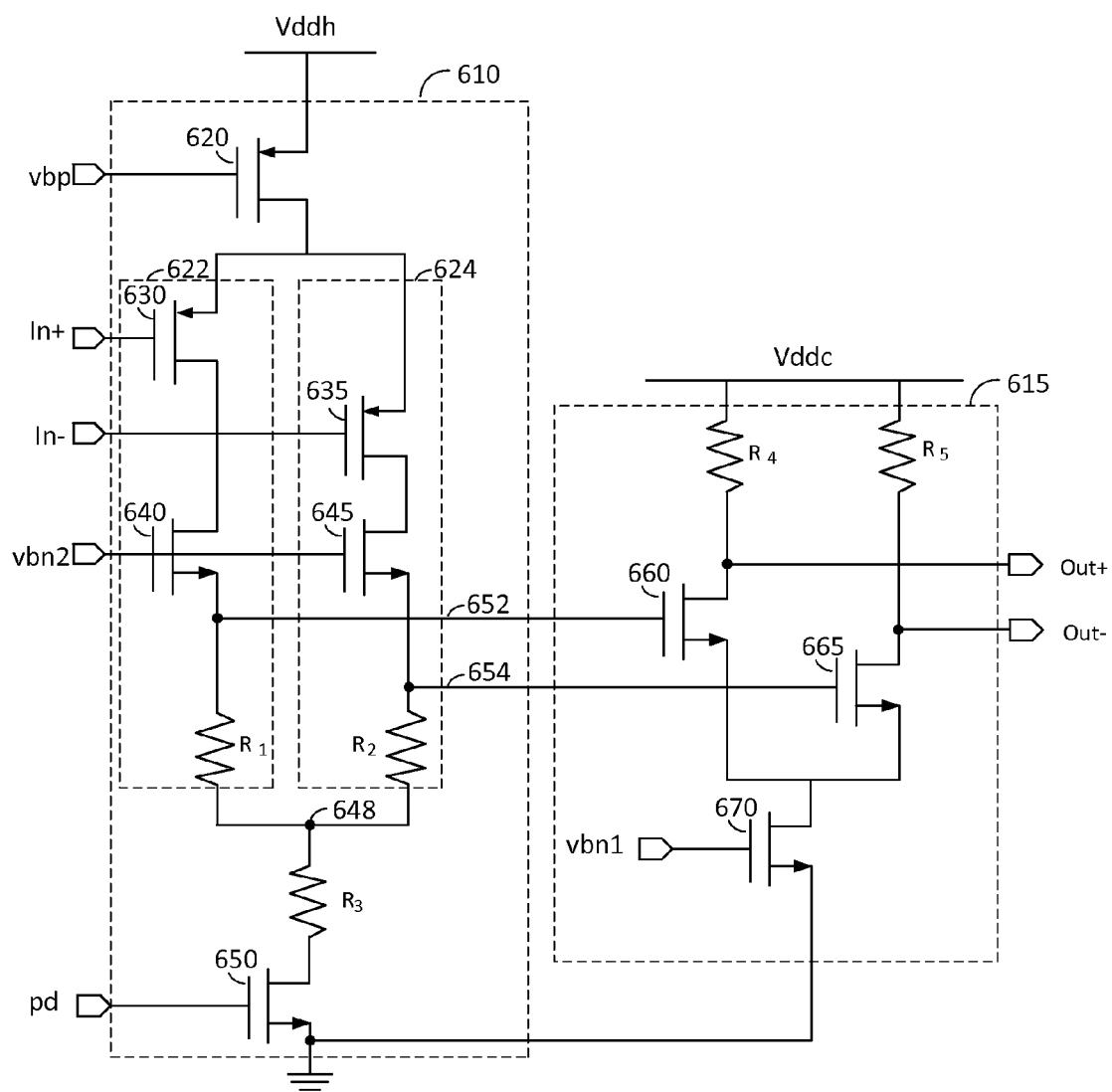
FIG. 6 shows a high-power-supply buffer and a core-power-supply buffer according to an embodiment of the present disclosure.

FIG. 6 shows an exemplary implementation of a high-power-supply buffer 610 and a core-power-supply buffer 615 according to an embodiment of the present disclosure. The high-power-supply buffer 610 may be used to implement the high-power-supply data buffer 310 and/or the high-power-supply clock buffer 320. The core-power-supply buffer 615 may be used to implement the core-power-supply data buffer 315 and/or the core-power-supply clock buffer 325.

The high-supply buffer 610 comprises a current-bias PMOS transistor 620, and two branches 622 and 624. The first branch 622 comprises a first input PMOS transistor 630, a first protection NMOS transistor 640, and a first resistor $R_1$. The second branch 624 comprises a second input PMOS transistor 635, a second protection NMOS transistor 645, and a second resistor $R_2$. The high-supply buffer 610 also comprises a third resistor $R_3$, and a first current-bias NMOS transistor 650.

The gates of the first and second input PMOS transistors 630 and 635 are coupled to the differential input In+ and In− of the high-supply buffer 610, forming a PMOS differential pair. When the high-supply buffer 610 is used to implement the high-supply data buffer 310, the differential input In+ and In− corresponds to the differential input 222 and 224 of the high-supply data buffer 310. Similarly, when the high-supply buffer 610 is used to implement the high-supply clock buffer 320, the differential input In+ and In− corresponds to the differential input 242 and 244 of the high-supply clock buffer 320.

When the high-supply buffer 610 is used to implement the high-supply data buffer 310, the current-bias PMOS transistor 620 corresponds to the eighth PMOS transistor 344 of the second current mirror 340. Similarly, when the high-supply buffer 610 is used to implement the high-supply clock buffer 320, the current-bias PMOS transistor 620 corresponds to the seventh PMOS transistor 342 of the second current mirror 340. In either case, the gate of the current-bias PMOS transistor 620 is biased by the gate voltage vpb of the ninth PMOS transistor 346 of the second current mirror 340, and therefore the current of the current-bias PMOS transistor 620 mirrors the current of the ninth PMOS transistor 346, which is controlled by the current source 370, as discussed above.

The DC current from the current-bias PMOS transistor 620 is split between the first and second branches 622 and 624 of the high-supply buffer 610. The DC current in the first branch 622 flows through the first input PMOS transistor 630, the first protection NMOS transistor 640 and the first resistor $R_1$. The DC current in the second branch 624 flows through the second input PMOS transistor 635, the second protection NMOS transistor 645 and the second resistor $R_2$. The DC currents in the two branches 622 and 624 recombine at node 648, and flow through the third resistor $R_3$ and the first current-bias NMOS transistor 650, which is gate biased by voltage pd.

The differential output of the high-supply buffer 610 comprises a first output 652 coupled between the source of the first protection NMOS transistor 640 and the first resistor $R_1$, and a second output 654 coupled between the source of the second protection NMOS transistor 645 and the second resistor $R_2$. As discussed further below, the differential output of the high-supply buffer 610 is coupled to a differential input of the core-supply buffer 615.

The DC voltage at the first output 652 of the high-supply buffer 610 is determined by the current-resistor (IR) voltage drops across the first and third resistors $R_1$ and $R_3$, and the DC voltage at the second output 654 of the high-supply buffer 610 is determined by the current-resistor (IR) voltage drops across the second and third resistors $R_2$ and $R_3$. The bias current and the resistances of the resistors $R_1$, $R_2$ and $R_3$ may be chosen such that the DC voltages at the first and second outputs 652 and 654 are within the voltage range of core devices (e.g., 0.9 V) in the core-supply buffer 615. This allows the differential output of the high-supply buffer 610 to be output to core devices in the core-supply buffer 615, as discussed further below.

The first protection NMOS 640 is configured to protect the first input PMOS transistor 630 from excessive voltages. The drain of the first protection NMOS transistor 640 is coupled to the drain of the first input PMOS transistor 630 and the source of the first protection NMOS 640 is coupled to the first resistor $R_1$. The gate of the first protection NMOS transistor 640 may be biased by the bias voltage vbn2 from the bias network 330. The drain-to-source voltage drop across the first protection NMOS 640 reduces the source-to-drain voltage drop across the first input PMOS transistor 630, thereby protecting the first input PMOS transistor 630 from excessive voltages. For example, the first input PMOS transistor 630 may be implemented with an I/O device having a voltage range of approximately 1.8, while the high-supply voltage vddh may be 3.3 V. In this example, the drain-to-source voltage drop across the first protection NMOS transistor 640 prevents the source-to-drain voltage drop across the first input PMOS transistor 630 from exceeding 1.8 V.

The second protection NMOS 645 is configured to protect the second input PMOS transistor 635 from excessive voltages. The drain of the second protection NMOS transistor 645 is coupled to the drain of the second input PMOS transistor 635 and the source of the second protection NMOS 645 is coupled to the second resistor $R_2$. The gate of the second protection NMOS transistor 645 may be biased by the bias voltage vbn2 from the bias network 330. The drain-to-source voltage drop across the second protection NMOS 645 reduces the source-to-drain voltage drop across the second input PMOS transistor 635, thereby protecting the second input PMOS transistor 635 from excessive voltages.

The core-supply buffer 615 comprises a first input NMOS transistor 660 and a second input NMOS transistor 665 forming an NMOS differential pair. The gate of the first input NMOS transistor 660 is coupled to the first output 652 of the high-supply buffer 610, and the gate of the second input NMOS transistor 665 is coupled to the second output 654 of the high-supply buffer 610.

The core-supply buffer 615 also comprises a fourth resistor $R_4$ coupled between the core-supply voltage Vddc (e.g., 0.9) and the drain of the first input NMOS transistor 660, and a fifth resistor $R_5$ coupled between the core-supply voltage Vddc and the drain of the second input NMOS transistor 665. The core-supply buffer 615 also comprises a second current-bias NMOS transistor 670 configured to provide a DC bias current that is split between the first and second input NMOS transistor 660 and 665. The drain of the second current-bias NMOS transistor 670 is coupled to the sources of the first and second input NMOS transistors 660 and 665, and the gate of the second current-bias NMOS transistor 670 is biased by bias voltage vbn1 from the bias network 330.

The differential output (Out+ and Out−) of the core-supply buffer 615 is taken between the drains of the first and second input NMOS transistor 660 and 665. When the core-supply buffer 615 is used to implement the core-supply data buffer 315, the differential output (Out+ and Out−) outputs the differential data signal (Data+ and Data−) to core devices. Similarly, when the core-supply buffer 615 is used to implement the core-supply clock buffer 325, the differential output (Out+ and Out−) outputs the differential clock signal (Clk+ and Clk−) to core devices.

In one embodiment, the NMOS transistors 660, 665 and 670 are core devices while the other transistors shown in FIG. 6 are I/O devices.

Figure 7:
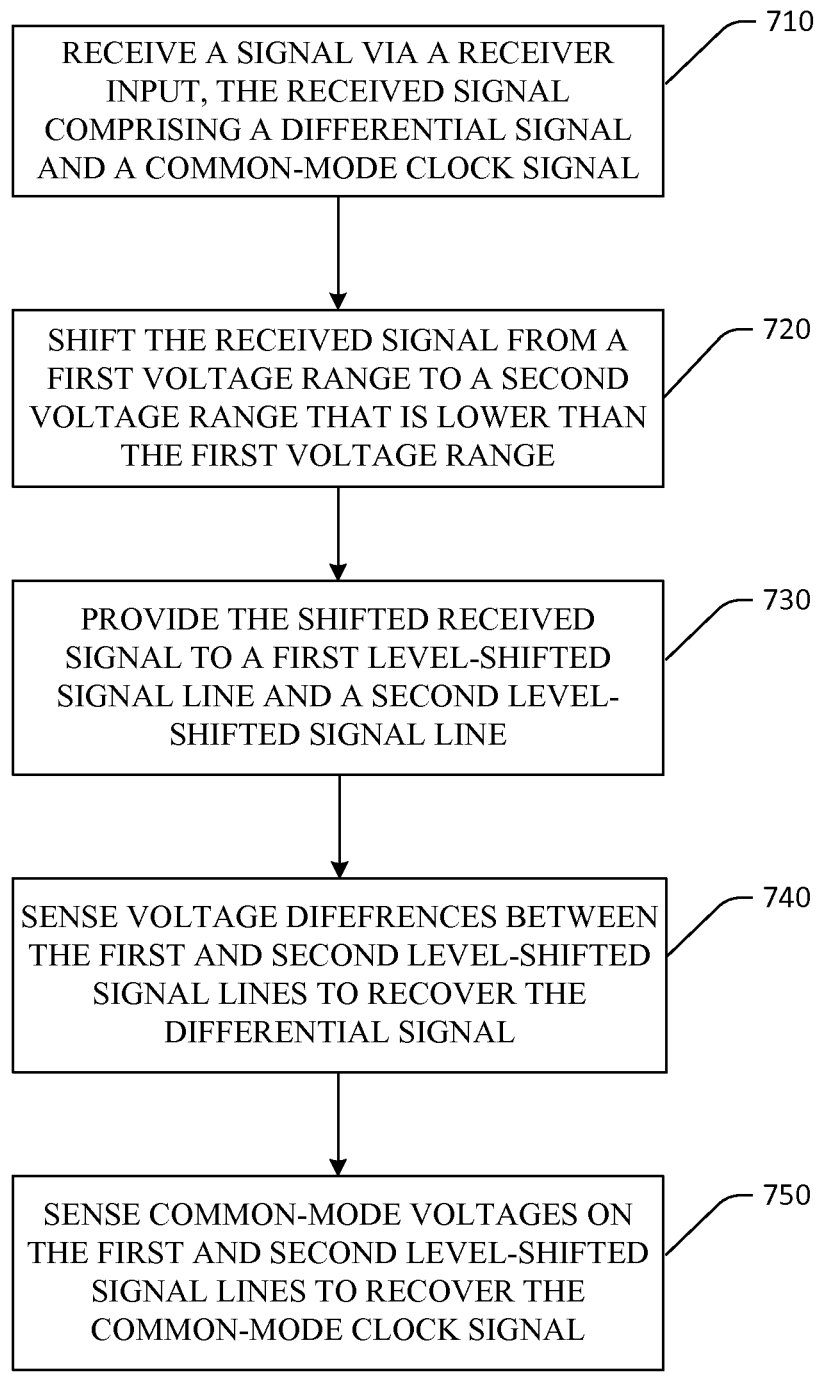
FIG. 7 is a flowchart illustrating a method for receiving a signal according to an embodiment of the present disclosure.

FIG. 7 is a flow diagram of a method 700 for receiving a signal at a receiver according to an embodiment of the present disclosure.

In step 710, the signal is received via a receiver input (e.g., the first and second receive lines 204 and 206). The received signal comprises a differential signal and a common-mode clock signal.

In step 720, the received signal is shifted from a first voltage range to a second voltage range that is lower than the first voltage range. For example, the received signal may be voltage-shifted by diode-connected transistors (e.g., the first diode-connected PMOS transistor 312 coupled to the first receive signal line 204, and the second diode-connected PMOS transistor 314 coupled to the second receive signal line 206).

In step 730, the shifted received signal is provided on a first level-shifted signal line and a second level-shifted signal line (e.g., the first and second level-shifted lines 214 and 216).

In step 740, voltage differences between the first and second level-shifted lines are sensed to recover the differential signal from the shifted received signal. For example, the voltage differences between the first and second level-shifted lines may be sensed at a differential input of a buffer coupled to the first and second level-shifted signal lines (e.g., the differential input 222 and 224 of the data buffer 220).

In step 750, common-mode voltages on the first and second level-shifted signal lines are sensed to recover the common-mode clock signal from the shifted received signal. For example, the common-mode voltages on the first and second level-shifted signal lines may be sensed at a node between two resistors coupled in series between the first and second level-shifted signal lines (e.g., the node 316 between the first and second clock resistors $R_{C_1}$ and $R_{C_2}$).

Those skilled in the art would appreciate that embodiments of the present disclosure are not limited to the examples described herein. For example, the bias network 330 may be implemented using a voltage divider comprising resistors. Also, one or more of the NMOS transistors used for voltage protection may be omitted. For example, if the first and second input PMOS transistors 630 and 635 are capable of handling higher voltages and/or the high-supply voltage Vddh is lower, then the first and second protection NMOS transistors 640 and 645 may be omitted. If less voltage protection is needed for the core devices, then one NMOS transistor may be used for each core device in the current source circuit 255 instead of two. Conversely, if additional voltage protection is desired, then additional NMOS transistors may be stacked together to provide greater voltage protection for the core devices. For example, three NMOS transistors may be stacked together for each core device in the current source circuit 255 instead of two NMOS transistors to provide each core device with greater voltage protection.

Although the level shifter 210 comprises diode-connected PMOS transistors 312 and 314 in the example discussed above, those skilled in the art would appreciate that the level shifter 210 may be implemented using diodes, resistors and/or other types of diode-connected transistors to provide voltage-level shifting. Also, those skilled in the art would appreciate that the AC shunt may be coupled directly to the differential input 222 and 224 of the data buffer 220 instead of through the first protection circuit 245.

Those skilled in the art would appreciate that the circuits described herein may be realized using a variety of transistor types, and are therefore not limited to the particular transistor types shown in the figures. For example, transistor types such as bipolar junction transistors, junction field effect transistor or any other transistor type may be used. Those skilled in the art would also appreciate that the circuits described herein may be fabricated with various IC process technologies such as CMOS, bipolar junction transistor (BJT), bipolar-CMOS (BiCMOS), silicon germanium (SiGe), gallium arsenide (GaAs), etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A receiver, comprising:
    a receiver input with a first receive signal line and a second receive signal line for receiving a signal, the received signal comprising a differential signal and a common-mode clock signal;
    a voltage-level shifter coupled to the first and second receive signal lines, and configured to shift the received signal from a first voltage range to a second voltage range that is lower than the first voltage range, and to provide the shifted received signal on a first level-shifted signal line and a second level-shifted signal line;
    a data buffer having a differential input coupled to the first and second level-shifted signal lines, and configured to recover the differential signal by sensing voltage differences between the first and second level-shifted signal lines; and
    a clock recovery circuit coupled to the first and second level-shifted signal lines, and configured to recover the common-mode clock signal by sensing common-mode voltages on the first and second level-shifted signal lines.

2. The receiver of claim 1, wherein the voltage-level shifter comprises a first diode-connected transistor coupled between the first receive signal line and the first level-shifted signal line, and a second a second diode-connected transistor coupled between the second receive signal line and the second level-shifted signal line.

3. The received of claim 1, wherein the first diode-connected transistor comprises a first diode-connected PMOS transistor, and the second diode-connected transistor comprises a second diode-connected PMOS transistor.

4. The receiver of claim 1, further comprising an AC shunt coupled to the receiver input, and configured to pass an AC portion of the differential signal in the received signal to the differential input of the data buffer.

5. The receiver of claim 4, wherein the AC shunt comprises a first capacitor coupled between the first receive signal line and the differential input of the data buffer, and a second capacitor coupled between the second receive signal line and the differential input of the data buffer.

6. The receiver of claim 1, wherein the clock recovery circuit comprises a first resistor and a second resistor coupled in series between the first and second level-shifted signal lines, and the common-mode clock signal is recovered at a node between the first and second resistors.

7. The receiver of claim 1, wherein the clock recovery circuit is configured to output a first clock signal and a second clock signal based on the recovered common-mode clock signal, and the receiver further comprises a clock buffer coupled to the clock-recovery circuit, and configured to convert the first and second clock signals into a differential clock signal.

8. The receiver of claim 7, wherein the first clock signal comprises the recovered common-mode clock signal and the second clock signal comprises a time average of the recovered common-mode clock signal.

9. The receiver of claim 8, wherein the clock recovery circuit comprises a low-pass filter for obtaining the time average of the recovered common-mode clock signal.

10. The receiver of claim 7, wherein the clock buffer is configured to convert the differential clock signal from a first power-supply domain to a second power-supply domain that is lower than the first power-supply domain.

11. The receiver of claim 1, wherein the data buffer is configured to convert the recovered differential signal from a first power-supply domain to a second power-supply domain that is lower than the first power-supply domain.

12. The receiver of claim 1, further comprising:
    a current source circuit; and
    a voltage-protection circuit coupled between the voltage-level shifter and the current source circuit, and configured to lower voltages at the voltage-level shifter to lower voltages at the current source circuit.

13. The receiver of claim 12, wherein the voltage-protection circuit comprises one or more NMOS transistors coupled between the voltage-level shifter and the current source circuit, and a gate of each of the NMOS transistors is biased by a bias network.

14. The receiver of claim 1, wherein the received signal comprises a multimedia high-definition link (MHL) signal.

15. A method for receiving a signal, comprising:
    receiving the signal via a receiver input, the received signal comprising a differential signal and a common-mode clock signal;
    shifting the received signal from a first voltage range to a second voltage range that is lower than the first voltage range;
    providing the shifted received signal on a first level-shifted signal line and a second level-shifted signal line;
    sensing voltage differences between the first and second level-shifted lines to recover the differential signal; and
    sensing common-mode voltages on the first and second level-shifted signal lines to recover the common-mode clock signal.

16. The method of claim 15, wherein the shifting is performed along a first path, and the method further comprises passing an AC portion of the differential signal in the received signal from the receiver input to the first and second level-shifted signal lines via a second path that is in parallel with the first path.

17. The method of claim 15, further comprising:
    outputting a first clock signal and a second clock signal based on the recovered common-mode clock signal; and
    converting the first and second clock signals into a differential clock signal.

18. The method of claim 17, wherein the first clock signal comprises the recovered common-mode clock signal and the second clock signal comprises a time average of the recovered common-mode clock signal.

19. The method of claim 18, further comprising performing low-pass filtering on the recovered common-mode clock signal to obtain the time average of the recovered common-mode clock signal.

20. The method of claim 17, further comprising converting the differential clock signal from a first power-supply domain to a second power-supply domain that is lower than the first power-supply domain.

21. The method of claim 15, further comprising converting the recovered differential signal from a first power-supply domain to a second power-supply domain that is lower than the first power-supply domain.

22. An apparatus for receiving a signal, comprising:
   means for receiving the signal via a receiver input, the received signal comprising a differential signal and a common-mode clock signal;
   means for shifting the received signal from a first voltage range to a second voltage range that is lower than the first voltage range;
   means for providing the shifted received signal on a first level-shifted signal line and a second level-shifted signal line;
   means for sensing voltage differences between the first and second level-shifted lines to recover the differential signal; and
   means for sensing common-mode voltages on the first and second level-shifted signal lines to recover the common-mode clock signal.

23. The apparatus of claim 22, wherein the means for shifting is located along a first path, and the apparatus further comprises means for passing an AC portion of the differential signal in the received signal from the receiver input to the first and second level-shifted signal lines via a second path that is in parallel with the first path.

24. The apparatus of claim 22, further comprising:
   means for outputting a first clock signal and a second clock signal based on the recovered common-mode clock signal; and
   means for converting the first and second clock signals into a differential clock signal.

25. The apparatus of claim 24, wherein the first clock signal comprises the recovered common-mode clock signal and the second clock signal comprises a time average of the recovered common-mode clock signal.

26. The apparatus of claim 25, further comprising means for performing low-pass filtering on the recovered common-mode clock signal to obtain the time average of the recovered common-mode clock signal.

27. The apparatus of claim 24, further comprising converting the differential clock signal from a first power-supply domain to a second power-supply domain that is lower than the first power-supply domain.

28. The apparatus of claim 22, further comprising converting the recovered differential signal from a first power-supply domain to a second power-supply domain that is lower than the first power-supply domain.

* * * * *